United States Patent
Tomiji

(10) Patent No.: US 7,347,308 B2
(45) Date of Patent: Mar. 25, 2008

(54) DAMPER

(75) Inventor: Katsuyasu Tomiji, Kamakura (JP)

(73) Assignee: NIFCO Inc., Yokohama (JP)

( * ) Notice: Subject to any disclaimer, the term of this patent is extended or adjusted under 35 U.S.C. 154(b) by 0 days.

(21) Appl. No.: 11/009,043

(22) Filed: Dec. 13, 2004

(65) Prior Publication Data

US 2005/0139440 A1    Jun. 30, 2005

(30) Foreign Application Priority Data

Dec. 26, 2003  (JP)  ............... 2003-433572

(51) Int. Cl.
*F16F 9/50* (2006.01)
(52) U.S. Cl. ............... 188/282.8; 188/280; 188/322.15
(58) Field of Classification Search ................ 188/280, 188/281, 282.1, 282.8, 322.13, 322.15
See application file for complete search history.

(56) References Cited

U.S. PATENT DOCUMENTS

| | | | | |
|---|---|---|---|---|
| 2,252,771 | A | * | 8/1941 | Katcher ...................... 188/280 |
| 2,916,281 | A | * | 12/1959 | Hehn ......................... 188/280 |
| 5,682,927 | A | | 11/1997 | Takahashi et al. |
| 5,730,260 | A | | 3/1998 | Thyssen |
| 5,927,448 | A | * | 7/1999 | Yamazaki ................... 188/281 |

FOREIGN PATENT DOCUMENTS

| | | |
|---|---|---|
| EP | 0 752 357 | 1/1997 |
| EP | 1 098 108 | 5/2001 |
| FR | 660781 | 7/1929 |
| FR | 2.194.267 | 2/1974 |
| FR | 2414153 | 8/1979 |
| JP | 63-18846 | 5/1988 |
| JP | 3465978 | 8/2003 |

\* cited by examiner

Primary Examiner—Bradley King
(74) Attorney, Agent, or Firm—Manabu Kanesaka

(57) ABSTRACT

A damper includes a piston with an orifice communicating in an axial direction and dividing a cylinder into two portions in the axial direction, and provides a braking force by resistance of a viscous fluid passing through the orifice when the piston moves inside the cylinder. The piston includes an inner member and an outer member movable in the inner member in the axial direction, which are loosely fitted with a gap for passing the viscous fluid. The inner and outer members are elastically urged with a spring in a direction wherein the inner and outer members are spaced. As the inner member moves to the outer member faster, the gap becomes narrower.

8 Claims, 2 Drawing Sheets

DAMPER

BACKGROUND OF THE INVENTION AND RELATED ART STATEMENT

The present invention relates to a damper and, more specifically, a damper in which a piston with orifice slides in a cylinder filled with a viscous fluid.

In order to prevent a sound of sudden closing of a cabinet door and the like, a damper is provided in a doorstop portion of a cabinet for reducing a closing speed of the cabinet door.

As the damper for generating a braking force mentioned above, there has been known a damper including: a cylinder filled with a viscous fluid; a piston dividing inside the cylinder into two portions in an axial direction and including an orifice communicating in the axial direction; and a piston rod connected to the piston. The damper generates the braking force (damping force) through resistance of the viscous fluid passing through the orifice when the piston moves together with the piston rod inside the cylinder in the axial direction (see Patent Reference No. 1).

Patent Reference No. 1: Japanese Patent Publication (Kokai) No. 3465978.

The above-mentioned damper uses a characteristic wherein flow resistance of a viscous fluid progressively increases with a moving speed of a piston. For example, when a damper is provided in a door for absorbing a shock, small resistance acts on a slow closing-door operation and large braking force acts on a sudden closing-door operation.

A diameter of the orifice provided in the piston is adjusted to control the braking force. When the control force during a low speed is set appropriately, the braking force during a high speed may become too small. On the other hand, when the braking force during the high speed is set appropriately, an operational performance during the low speed may be lowered. Specifically, it is difficult to have a wide dynamic range of the braking force.

SUMMARY OF THE INVENTION

In order to solve the above-mentioned problem and provide a damper wherein a proportion of a change in a braking force with respect to a change in a piston speed is increased to extend an adaptable range, according to a first aspect of the present invention, a damper includes: a cylinder filled with a viscous fluid; a piston including an orifice communicating in an axial direction and dividing inside the cylinder into two portions in the axial direction; and a piston rod connected to the piston. The damper generates the braking force through resistance of the viscous fluid passing through the orifice when the piston moves together with the piston rod inside the cylinder in the axial direction. The piston is formed of an inner member integrated with the piston rod, and an outer member disposed on an outer circumference of the inner member to be movable in the axial direction. The inner and outer members are loosely fitted together with a gap in between for passing the viscous fluid. Also, the inner and outer members are elastically urged with a compression-coil spring in a direction wherein the inner and outer members are spaced. The gap becomes narrower when the inner member moves into the outer member further.

According to the structure in the first aspect of the present invention, when a moving speed of the piston rod is relatively low, the gap between the inner member and the outer member is maintained to be large by an elastic force of the compression-coil spring. Accordingly, the flow resistance of the viscous fluid is small, so that operational performance is not lowered. When the moving speed of the piston rod exceeds a predetermined level and the resistance of the viscous fluid acting on the outer member exceeds an extension limit of the compression-coil spring, the coil spring contracts and the inner member moves into the outer member. Accordingly, the gap between the inner member and the outer member becomes narrower, and the flow resistance of the viscous fluid passing through the gap increases, thereby generating a large braking force. Specifically, in the present invention, it is possible to increase the proportion of the change in the braking force with respect to the change in the piston speed, thereby expanding the adaptable range of the damper.

DETAILED DESCRIPTION OF PREFERRED EMBODIMENTS

Hereunder, embodiments of the present invention will be explained with reference to the attached drawings.

Figure 1:
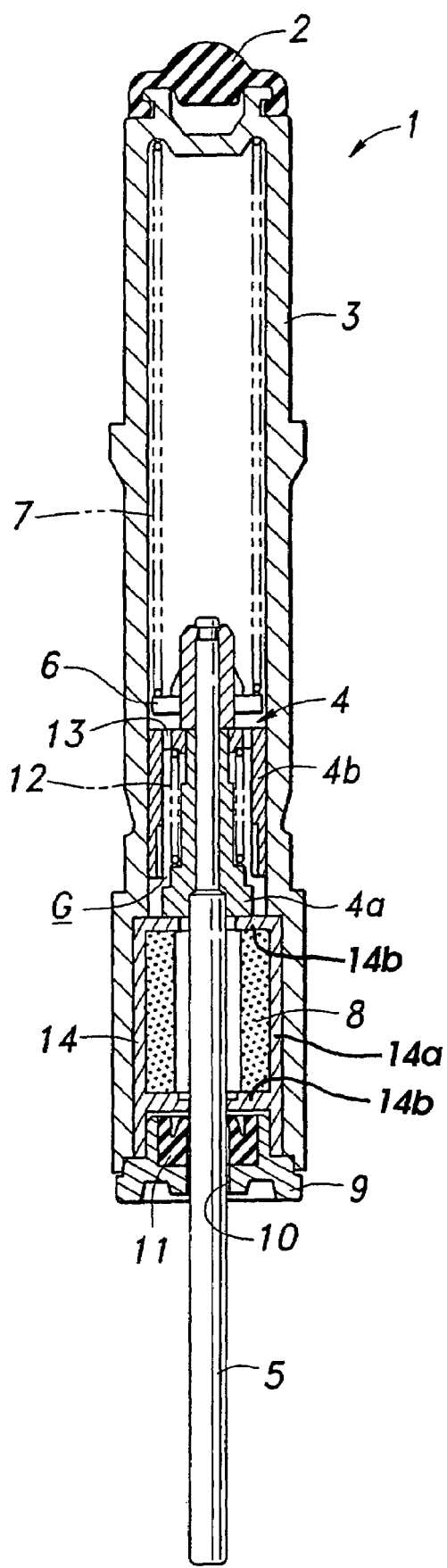
FIG. 1 is a cross sectional view of a damper during a low-speed operation.

FIG. 1 is a cross sectional view of a damper according to the present invention. A damper 1 is formed of: a cylinder 3 with a closed bottom and a cushion rubber 2 placed on an outer-end surface; a piston 4 slidably fitted in the cylinder 3; a piston rod 5 connected to the piston 4; a first compression-coil spring 7 disposed between a spring retainer 6 provided on an inner end side of the piston rod 5 and an inner surface of a bottom wall of the cylinder 3; an accumulator 8 provided on a cylinder top side; and a cap 9 for closing the cylinder top. The piston rod 5 is inserted into a center hole 10 of the cap 9 via an oil seal 11 and projects outside the cylinder 3. Silicon oil with an appropriate viscosity is filled in the cylinder 3.

The piston 4 is formed of: an inner member 4a substantially integrated with the inner end side of the piston rod 5; and an outer member 4b loosely fitted into the inner member 4a with a predetermined gap G from an outer circumferential surface of the inner member 4a. The outer member 4b slides along an inner circumferential surface of the cylinder 3. A second compression-coil spring 12 is placed between the inner member 4a and the outer member 4b for elastically urging the inner member 4a and the outer member 4b in a direction wherein the inner member 4a and the outer member 4b are spaced in the axial direction. An external diameter of the inner member 4a increases stepwise toward an outer end side. When the inner member 4a moves into the outer member 4b, the gap G between the inner member 4a and the outer member 4b becomes narrower. The outer member 4b has a cylindrical shape with a bottom. An orifice 13 with an appropriate opening is formed in a bottom wall of the outer member 4b for passing silicon oil. The accumulator 8 has a cylindrical shape, and is formed of a foam plastic with elasticity for shrinking when a specific pressure is applied. The accumulator 8 is retained through a retainer 14 on the inner circumferential surface on the cylinder top side. The retainer 14 is immovably disposed at one side of the cylinder 3 and has an outer wall 14a contacting the cylinder 3 and two end walls 14b extending perpendicular to the outer wall 14a to define an inner space of the retainer by the outer wall and two end walls.

Next, an operation of the damper of the present invention will be explained.

As shown in FIG. 1, normally, the piston rod 5 projects outwardly through the center hole 10 of the cap 9 with the elastic force of the first compression-coil spring 7. The outer member 4b of the piston 4 abuts against the spring retainer 6 provided on the inner end side of the piston rod 5 so as not to come off with the elastic force of the second compression-coil spring 12.

The cylinder 3 is fixed to, for example, an inner surface of a sidewall of a cabinet with appropriate means.

When a cabinet door is slowly closed from this state, the piston rod 5 pushed by an inner surface of the door is pushed into the cylinder 3 against the elastic force of the first compression-coil spring 7. At this point, silicon oil on the bottom side moves toward the top side through the orifice 13 of the outer member 4b of the piston 4 and the gap G between the outer member 4b and the inner member 4a, so that energy applied on the piston rod 5 decreases due to the flow resistance of silicon oil. In this state, the outer member 4b and the inner member 4a are spaced due to the elastic force of the second compression-coil spring 12, and the gap G between the outer member 4b and the inner member 4a is large, so that the braking force is in a low range.

Incidentally, when the piston rod 5 moves into the cylinder 3, an inner volume of the cylinder 3 decreases and a charged pressure of silicon oil increases. However, the increase in the charged pressure is absorbed by a compressive deformation of the accumulator 8 formed of a foam plastic.

Figure 2:
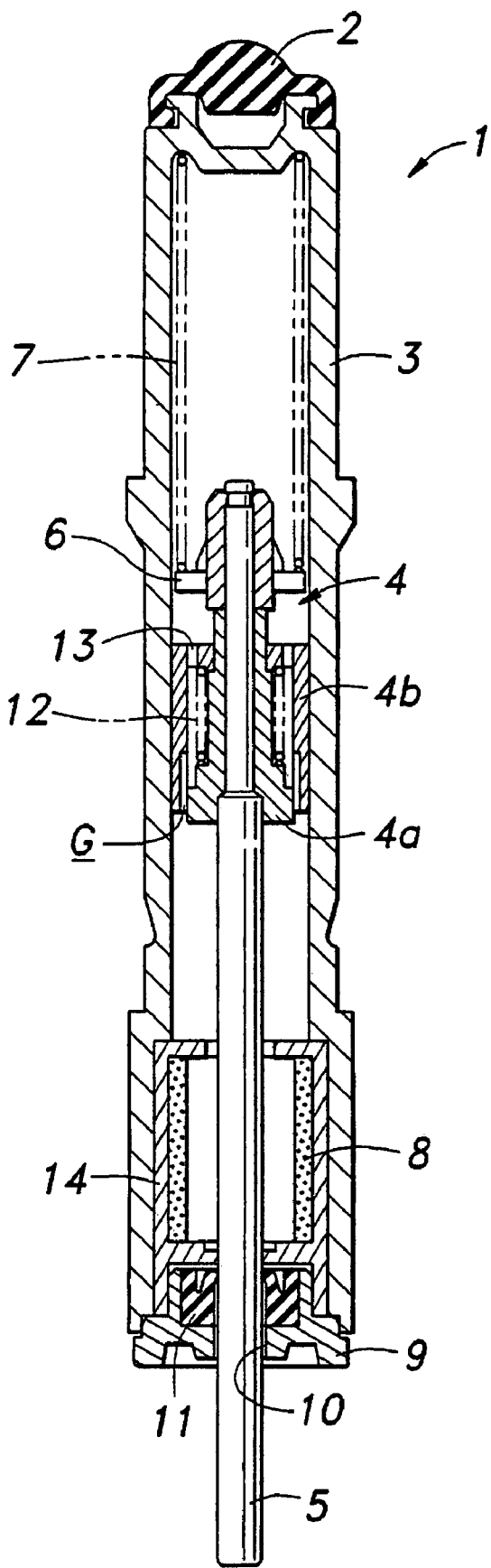
FIG. 2 is a cross sectional view of the damper during a high-speed operation.

The flow resistance of silicon oil progressively increases with respect to the piston speed. Accordingly, for example, when the second compression-coil spring 12 is set to contract by the resistance of silicon oil applied on the outer member 4b when the piston 4 moves at a speed greater than a certain velocity, the outer member 4b is difficult to move at a speed greater than the certain velocity. As a result, the second compression-coil spring 12 contracts, and as shown in FIG. 2, the inner member 4a moves into the outer member 4b. As a result, the gap G between the inner member 4a and the outer member 4b becomes narrower, and the braking force due to the flow resistance of silicon oil increases.

In this way, according to the present invention, since the compression-coil spring 12 is provided for detecting a speed at which the braking force is switched by the variable orifice, it is possible to constantly switch the speed with less influence from a change in an atmosphere temperature.

The variable orifice is formed of the gap G between two members moving relatively in the axial direction, i.e., the inner member 4a and the outer member 4b. Accordingly, it is possible to increase a variation width of the damping force according to a variation in the speed of the piston rod 5, thereby making it possible to set an operating characteristic more freely.

According to the damper of the present invention, since the width of the change in the damping force corresponding to the speed change can be increased, the adaptable range of the damper can be extended, and the damper can be easily adapted to different specifications.

The disclosure of Japanese Patent Application No. 2003-433572, filed on Dec. 26, 2003, is incorporated in the application.

While the invention has been explained with reference to the specific embodiments of the invention, the explanation is illustrative and the invention is limited only by the appended claims.

What is claimed is:

1. A damper comprising:
   a cylinder,
   viscous fluid filled in the cylinder,
   a piston disposed in the cylinder for dividing the cylinder into two portions in an axial direction and having an orifice communicating in the axial direction, said piston including a first member and a second member movable in the axial direction relative to the first member, said first and second members being loosely fitted to have a gap therebetween for passing the viscous fluid therethrough so that said gap decreases when the first member moves toward the second member,
   a piston rod extending into the cylinder and fixed to the first member,
   a first urging device disposed between the first and second members for elastically urging the second member in a direction that the second member is moved away from the first member so that a braking force is generated through flow resistance of the viscous fluid passing through the orifice and the gap when the piston moves together with the piston rod inside the cylinder in one direction,
   a retainer immovably disposed at one side of the cylinder and having an outer wall contacting the cylinder and two end walls extending perpendicular to the outer wall to define an inner space of the retainer by the outer wall and two end walls,
   an accumulator disposed in the inner space of the retainer defined by the outer wall and the two end walls, said accumulator being formed of a foam plastic with elasticity for absorbing a pressure applied to the viscous fluid by compressive deformation thereof when the piston rod is moved into the cylinder, and
   a cap for covering ends of the cylinder and the retainer, said cap partly entering inside the outer wall of the retainer so that said piston rod extends from an inside of the cylinder to an outside thereof through the accumulator, retainer and cap.

2. A damper according to claim 1, wherein said first urging device is arranged such that as the piston rod is moved faster, a size of the gap is reduced to thereby control a damping efficiency by a moving speed of the piston rod.

3. A damper according to claim 2, wherein said first member is an inner member, and said second member is an outer member movably disposed outside the inner member, said orifice being formed in the outer member.

4. A damper according to claim 2, further comprising a second urging device disposed in the cylinder for urging the piston rod in the axial direction toward the retainer.

5. A damper according to claim 4, wherein said piston rod includes a spring retainer at an end thereof so that the second urging device is disposed between the spring retainer and the other side of the cylinder.

6. A damper according to claim 5, further comprising an oil seal situated between the cap and one of the two end walls of the retainer inside the outer wall.

7. A camper according to claim 1, wherein said outer wall is arranged such that the inner space does not contact the cylinder.

8. A damper comprising:

a cylinder, viscous fluid filled in the cylinder, a piston disposed in the cylinder for dividing the cylinder into two portions in an axial direction and having an orifice communicating in the axial direction, said piston including a first member and a second member movable in the axial direction relative to the first member, said first and second members being loosely fitted to have a gap therebetween for passing the viscous fluid therethrough so that said gap decreases when the first member moves toward the second member, a piston rod extending into the cylinder and fixed to the first member, said piston rod having a spring retainer at an end thereof, a first spring disposed between the first and second members for elastically urging the second member in a direction that the first and second members are spaced apart from each other so that a braking force is generated through flow resistance of the viscous fluid passing through the orifice and the gap when the piston moves together with the piston rod inside the cylinder in one direction, a retainer immovably disposed at one side of the cylinder and having an outer wall contacting the cylinder and two end walls extending perpendicular to the outer wall to define an inner space of the retainer by the outer wall and two end walls, a second spring situated in the cylinder between a bottom of the cylinder and the spring retainer so that the piston is urged to be located adjacent to the retainer when no force is applied to the piston rod, an accumulator disposed in the inner space of the retainer defined by the outer wall and the two end walls, said accumulator being formed of a foam plastic with elasticity for absorbing a pressure applied to the viscous fluid by compressive deformation thereof when the piston rod is moved into the cylinder, and a cap for covering ends of the cylinder and the retainer, said cap partly entering inside the outer wall of the retainer so that said piston rod extends from an inside of the cylinder to an outside thereof through the accumulator, retainer and cap.

* * * * *